United States Patent [19]

Amitay

[11] Patent Number: 4,807,222
[45] Date of Patent: Feb. 21, 1989

[54] CORDLESS ACCESSED HIGH-SPEED HIGH-CAPACITY LOCAL AREA NETWORKS

[75] Inventor: Noach Amitay, Tinton Falls, N.J.

[73] Assignee: American Telephone and Telegraph Company AT&T Bell Laboratories, Murray Hill, N.J.

[21] Appl. No.: 899,647

[22] Filed: Aug. 25, 1986

[51] Int. Cl.$^4$ .............................................. H04J 3/02
[52] U.S. Cl. .................................................... 370/85
[58] Field of Search ....................... 370/85, 86, 89, 95, 370/94

[56] References Cited

U.S. PATENT DOCUMENTS

| | | | |
|---|---|---|---|
| 4,291,197 | 9/1981 | Yonaga | 179/2 |
| 4,503,533 | 3/1985 | Tobagi et al. | 370/85 |
| 4,555,810 | 11/1985 | Khoe et al. | 455/612 |
| 4,574,284 | 3/1986 | Feldman et al. | 340/825.52 |
| 4,663,758 | 5/1987 | Lambarelli et al. | 370/85 |
| 4,665,519 | 5/1987 | Kirchner et al. | 370/94 |

OTHER PUBLICATIONS

"NTSIO Terminal Server", Ethernet Sourcebook, 1985, p. 291.
Limb et al., BSTJ, vol. 61, No. 7, Sep. 1982, pp. 1413–1440.
Tseng et al., IEEE Jnl. Sel. Areas Comm., vol. SAC-a, No. 3, Apr. 1983, pp. 493–499.
Tsao, IEEE Comm. Mag., vol. 22, No. 8, Aug. 1984, pp. 7–11.
Finley, Jr., IEEE Comm. Mag. vol. 22, No. 8, Aug. 1984, pp. 22–35.
Bond et al., Telephony, vol. 207, No. 15, Oct. 1, 1984, pp. 104, 108, 112, 113.
Hermes et al., Jnl. Lightwave Tech., vol. LT-3, No. 3, Jun. 1985, pp. 467–471.
Matsushita et al., Jnl. Lightwave Tech., vol. LT-3, No. 3, pp. 544–555.
Kohashi et al., IEEE Jnl. Sel. Areas Comm., vol. SAC-3, No. 4, Jul. 1985, pp. 574–583.

*Primary Examiner*—Douglas W. Olms
*Assistant Examiner*—Wellington Chin
*Attorney, Agent, or Firm*—Erwin W. Pfeifle

[57] ABSTRACT

The present invention relates to a high-speed high-capacity Local Area Network (LAN) wherein each user, of a separate group of one or more of the network users, communicates cordlessly, using radio frequencies or infrared, with an assigned Regional Bus Interface Unit (RBIU) located in the proximity of the group. Each RBIU of the network interfaces with a high-speed serial or lower speed parallel bus of an open-ring network for purposes of transmitting information signals while receiving information signals via the high-speed serial network bus (es), Various communications protocols such as, for example, CSMA/CD, slotted ALOHA, etc. can be employed by the users in communicating with the associated RBIUs with high efficiency due to the short paths involved relative to the transmission frame durations used on the bus.

15 Claims, 6 Drawing Sheets

CORDLESS ACCESSED HIGH-SPEED HIGH-CAPACITY LOCAL AREA NETWORKS

TECHNICAL FIELD

The present invention relates to a cordless accessed high-speed, high-capacity Local Area Network (LAN) wherein each user, of a separate group of one or more network users, communicates cordlessly, using radio frequencies or infrared, with a separate assigned one of a plurality of regional bus interface units (RBIU) which is located in the group's proximity. The RBIUs of the network interface with a high-speed bus in either a serial open-ring arrangement or a parallel transmit/serial receive open-ring arrangement.

DESCRIPTION OF THE PRIOR ART

Local networks have taken various configurations and used various types of transmission. One such configuration is the well-known cellular mobile radio systems where many users within a cell communicate with a central base station using time division or frequency division multiplexing. Cordless telephone systems are also known wherein a radio telephone, having a radio transmitter and receiver, communicates with a remote radio station. In this regard see, for example, U.S. Pat. No. 4,291,197 issued to Y. Yonaga on Sept. 22, 1981. Besides radio waves it is also known to use infrared radiation as a free-space transmission alternative. In this regard see, for example, the article "Infrared Radiation: A Free-Space Optical Transmission Alternative" by J. Bond et al. in *Telephony,* Vol. 207, No. 15, Oct. 1, 1984, at pages 104, 108, 112, 116.

There are a multitude of Local Area Network (LAN) configurations and associated access protocols. In this regard see, for example, the articles by M. R. Finley, Jr. in *IEEE Communications Magazine,* Vol. 22, No. 8, August 1984, at pages 22-35; and S. Matsushita et al. in *Journal Of Lightwave Technology,* Vol. LT-3, No. 3, June 1985 at pages 544-555. Data rates of present and near future Local Area Networks (LANs) fall between 1 to 10 Mbits/s. These systems address the communication needs of voice, computers, and computer terminals. The protocols used are designed to maximize the throughput and utilization of the network under various traffic conditions. Multiple access communications require control of some type to schedule stations or end users seeking access to the LAN transmission medium. Various forms of Carrier Sense Multiple Access with Collision Detection (CSMA/CD) as well as token-passing techniques are usually employed to coordinate the access by the various stations. As long as the packet duration, T, is much greater than t, the round trip propagation time of the network, the above techniques are quite efficient. However, for very high-speed LANs where t>T, the above techniques result in poor utilization of the system.

The problem remaining in the prior art is to provide an LAN architecture which is suitable for very high-speed and high-capacity LANs and can maintain a very high utilization of the system, including reasonable bus waiting time delays even when the average traffic is close to the maximum amount of traffic that the system can ideally carry.

SUMMARY OF THE INVENTION

The foregoing problem in the prior art has been solved in accordance with the present invention which relates to a cordless accessed high-speed high-capacity Local Area Network (LAN) wherein each user, of a separate group of one or more network users, communicates cordlessly, using radio frequencies or infrared, with a separate assigned one of a plurality of regional bus interface units (RBIU) which is located in the group's proximity. More particularly, each RBIU is assigned one or more end users in the proximity thereto and uses, for example, a cellular frequency division arrangement with adjacent RBIUs to control interference. These RBIUs interface with a high-speed bus in either a serial open arrangement or a parallel transmit/serial receive arrangement.

Other and further aspects of the present invention will become apparent during the course of the following description and by reference to the accompanying drawings:

DETAILED DESCRIPTION

Figure 1:
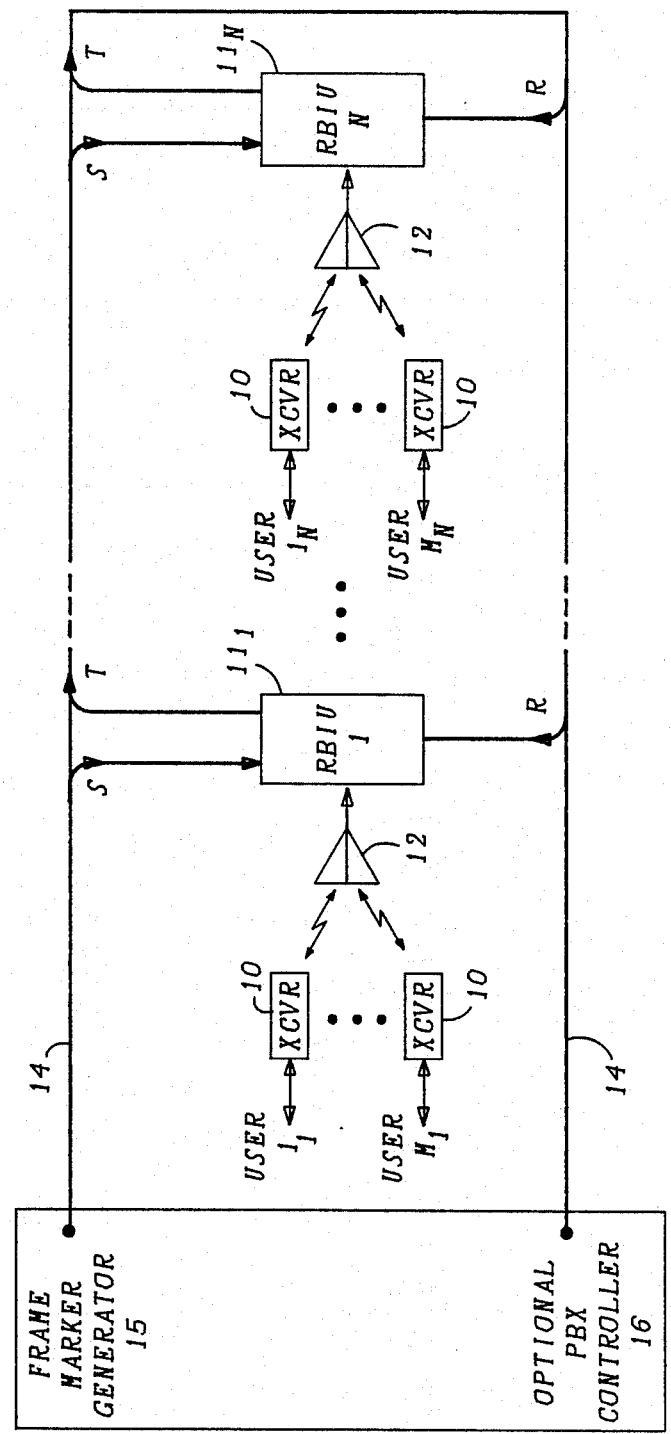
FIG. 1 is a block diagram of a unidirectional open-ring serial transmit/receive network architecture in accordance with the present invention.
Figure 6:
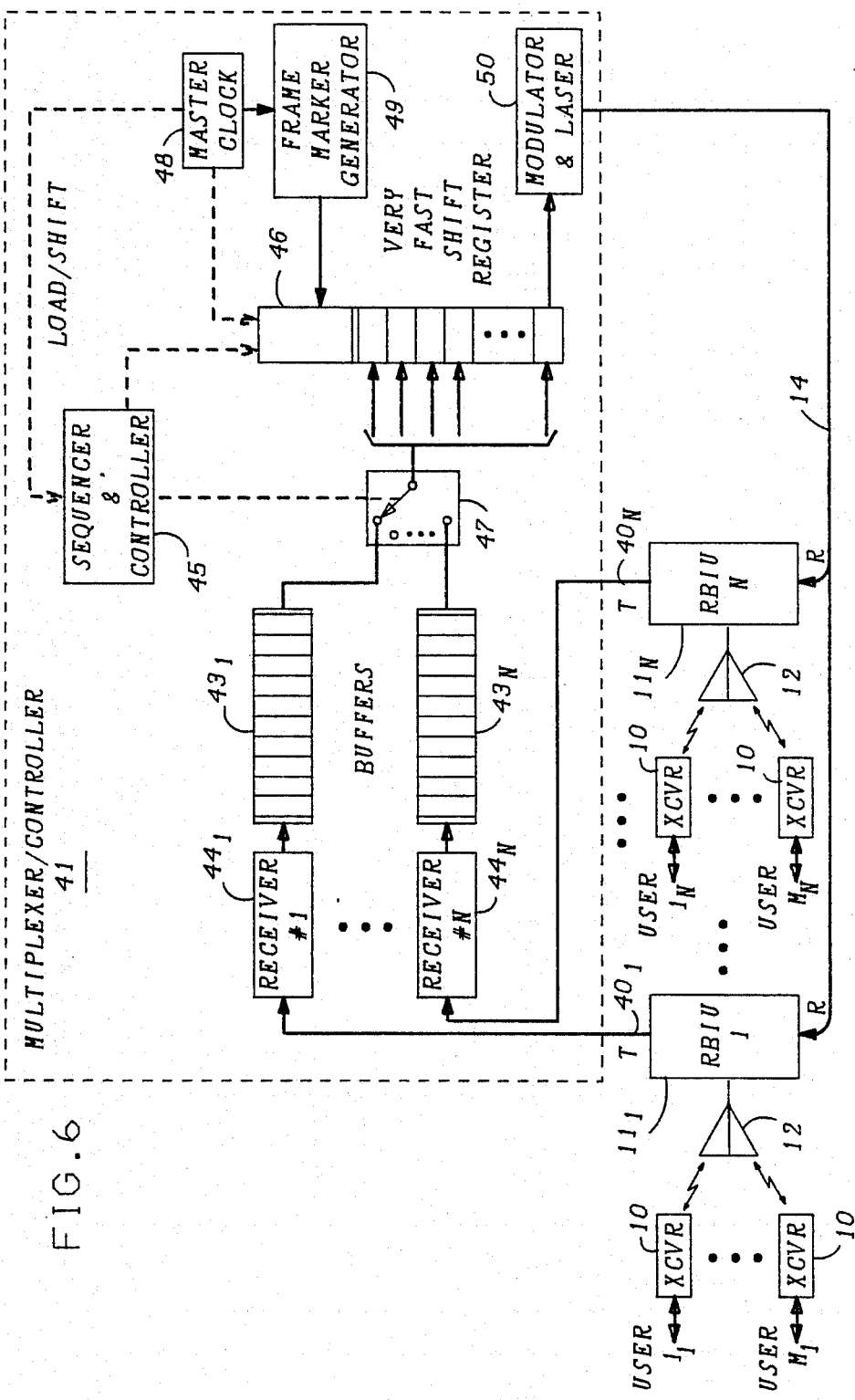
FIG. 6 is a block diagram of a unidirectional open-ring parallel transmit/serial receive network architecture with a multiplexer/controller in accordance with the present invention.

The present invention relates to a high-speed high-capacity Local Area Network (LAN) wherein the users of the network communicate cordlessly, using radio frequencies (RF) or infrared (IR), with an assigned one of a plurality of Regional Bus Interface Units (RBIUs) located in each user's proximity. The RBIUs also interface with a bus of the network in any suitable arrangement such as, for example, a serial open ring arrangement, as shown in FIG. 1, or a parallel transmit/serial receive open ring arrangement as shown in FIG. 6. Other suitable arrangements which might be applicable for use are, for example, that of the FASNET network arrangement shown in FIG. 2 of the article by J. O. Limb et al. in *The Bell System Technical Journal,* Vol. 61, No. 7, September 1982, at pages 1413-1440; and the D-Net and other arrangements described by C-W. Tseng et al. in *IEEE Journal On Selected Areas In Communication,* Vol. SAC-1, No. 3, April 1983, at pages 493-499.

FIG. 1 is a block diagram of a serial open-ring network in accordance with the present invention. More particularly, each user of the network includes an associated transceiver 10 which communicates signaling and data information cordlessly, via radio frequencies of a few GHz or via infrared, to a particular one of a plurality of N RBIUs $11_1$ to $11_N$. The plurality of N RBIUs are distributed at selected points around the network's service area, and each RBIU $11_i$ is shared by, for example, up to $M_i$ separate users located in its proximity. For such arrangement, a cellular frequency division arrangement of carriers, as is well-known and used in cellular mobile radio systems, can be used by adjacent RBIUs to control interference. Thus, in a commercial office environment, for example, where many people with telephones and/or computer terminals sit in a single large room, a ceiling-mounted wide angle antenna 12 at the associated RBIU $11_i$ can be used for communications between the RBIU and the plurality of associated $M_i$ end-user transceivers 10. In other office environments, where many small individual rooms are close to one another, an RBIU $11_i$ can serve a small cluster of rooms in a similar manner. Communication between the $M_i$ users and the associated RBIU $11_i$ can be accomplished, for example, by Time Division Multiple Access (TDMA), Frequency Division Multiple Access (FDMA), the slotted ALOHA protocol or any other suitable method. For purposes of discussion, and not for purposes of limitation, it will be assumed hereinafter that (a) the network uses TDMA techniques along a bus; (b) each RBIU $11_i$ processes the signals from the associated users into separate packets of information, including necessary control information, for transmission on a bus 14 to the destined users; and (c) the present network under discussion is an optical LAN transmitting lightwave signals along bus 14 which is an optical waveguide such as a single mode optical fiber bus.

Figure 4:
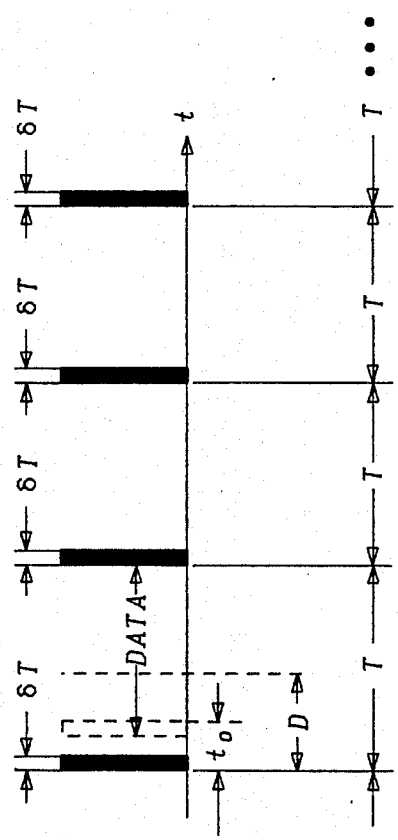
FIG. 4 is an exemplary time frame format for use in the present network arrangement.

In the serial open-ring network arrangement of FIG. 1, a Frame Marker Generator 15 is located at the headend of bus 14 for dividing the time on bus 14 into equal frames of duration T, as shown in FIG. 4. The markers transmitted by Frame Marker Generator 15 at the beginning of each frame serve as a source of synchronization for the entire network and consist of a periodic light modulated sequence of bits, of duration $\delta T$, transmitted every T seconds, with $\delta T < < T$. This function can also be incorporated on a standby basis within the first few RBIUs along bus 14 to increase the reliability of the network in case of a failure of Frame Marker Generator 15 at the head-end of bus 14. Alternatively, the frame marking function can be directly performed within the first RBIU $11_1$ in place of Frame Marker Generator 15 with the next few succeeding RBIUs providing standby operation. Each of the RBIUs $11_1$ to $11_N$ appropriately formats the signals from each of the associated M users into separate packets of information and, after detecting the markers from Frame Marker Generator 15 and then sensing that a frame is not being used by previous RBIUs on bus 14, the RBIU transmits a packet of information onto bus 14 during a detected empty frame period.

Figure 2:
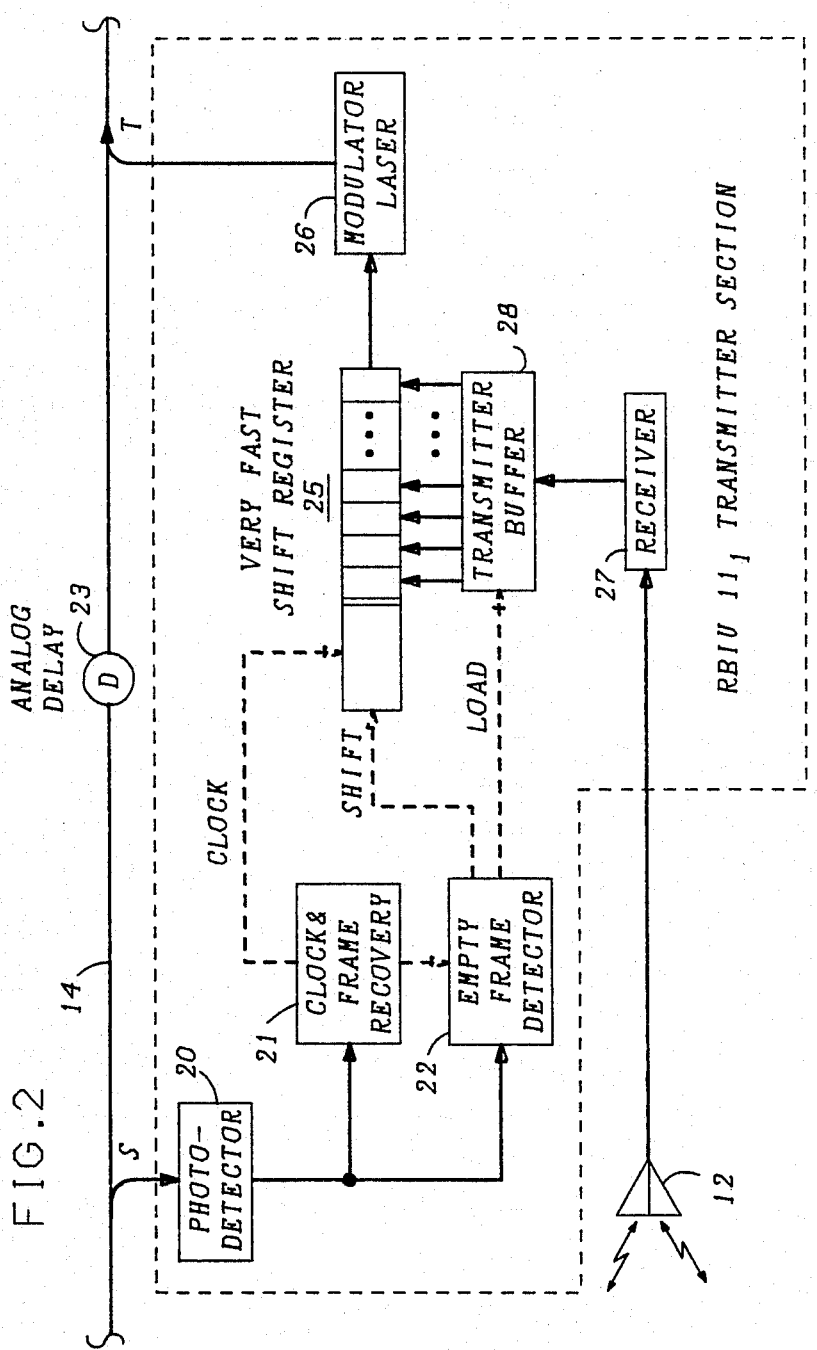
FIG. 2 is a block diagram of an exemplary BUS/RBIU transmitter interface architecture without regeneration.
Figure 3:
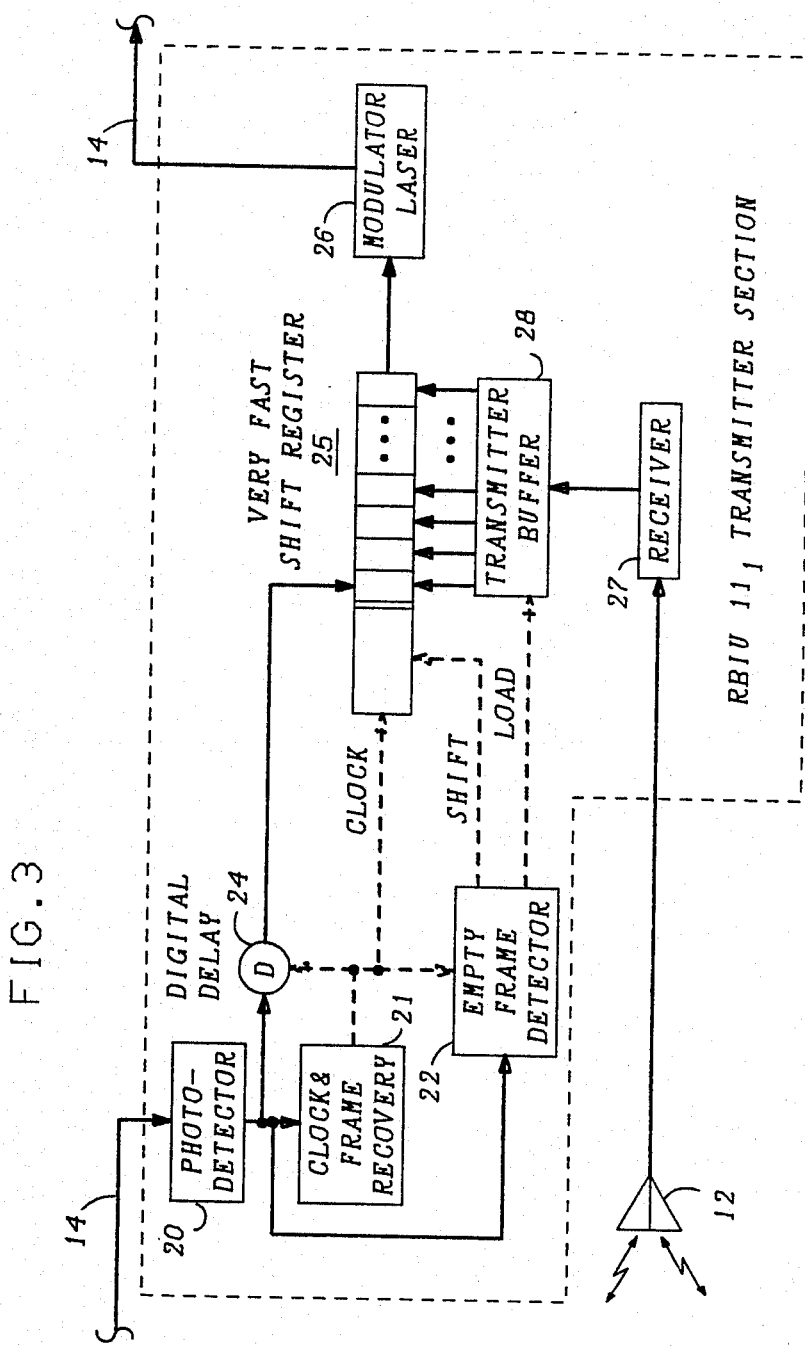
FIG. 3 is a block diagram of an exemplary BUS/RBIU transmitter interface architecture with regeneration.

FIG. 2 is a block diagram of the transmitter section of an RBIU $11_i$ which uses no regeneration of the signal on bus 14, while FIG. 3 is a block diagram of the transmitter section of an RBIU using regeneration. In the transmitter section of FIGS. 2 and 3, either a small part (FIG. 2) of, or all (FIG. 3) of, the light-modulated bit stream from serial bus 14 is demodulated by a photo detector 20 to, for example, baseband. This demodulated signal is received by both a Clock and Frame Recovery circuit 21 and an Empty Frame Detector 22. Clock and frame recovery circuit 21 functions to recover the frame markers generated by Frame Marker Generator 15 out of which a bit clock is generated. The Empty Frame Detector 22 receives the recovered frame markers from recovery circuit 21 and scan the frame during the time interval $t_o$, shown in FIG. 4, to determine whether the frame is occupied or not by a packet of information transmitted by one of the prior RBIUs 11 on bus 14. Time interval $t_o$ may typically be $\delta T$ plus a few bits in duration, or $t_o$ approximates $\delta T$.

If the frame is occupied with a packet of information transmitted by one of the preceding RBIUs 11, this packet of information will continue traveling on bus 14, in the arrangement of FIG. 2, through analog delay 23 preferably with very low attenuation. In FIG. 3, however, the packet of information from bus 14 is regenerated by serially feeding the packet through a digital delay circuit 24 to a Very Fast Shift Register 25 whose output modulates a laser light source 26 which has its output coupled to bus 14 for sending the modulated packet of information forward. In the arrangements of either one of FIGS. 2 or 3, if one or more end users have transmitted a signal to the associated RBIU $11_i$, this signal is received by the RBIU's antenna 12 for delivery to a receiver 27. It is to be understood that users 1-$M_i$ associated with an RBIU $11_i$ can transmit asynchronously using any suitable technique described hereinbefore, and that receiver 27 is arranged to receive such asynchronously transmitted signals and process them separately. Receiver 27 functions to collect the information received from each user, formats the information of each user by adding any required overhead protocol, buffers the formatted packet(s) if necessary, and transmits each formatted packet to a transmitter buffer 28 at the appropriate time.

Upon the receipt of a "Load" enable signal from Empty Frame Detector 22, transmitter buffer 28 transfers the packet stored therein in a parallel manner into shift register 25. When Empty Frame detector 22 generates a "shift" enable signal, the packet in shift register 25 is delivered in serial fashion to modulator laser 26 at the bit clock rate from Clock and Frame Recovery circuit 21 for transmission onto serial bus 14. The delay D in FIG. 4, which is analog in the arrangement of FIG. 2 and digital in the arrangement of FIG. 3, is of sufficient duration to enable the multiplexing of a packet of information from Transmitter Buffer 28 into a frame on the bus once that same frame is determined to be unoccupied. The delay D is approximately equal to $t_o$ plus, for example, up to 20 bits in duration.

This interface protocol is collision-free and, therefore, very efficient. As long as there is a packet of information available for transmission in Transmitter Buffer 28, it will be multiplexed onto bus 14 in the immediately detected unoccupied frame. When a packet of information becomes available in Transmitter Buffer 28 past the decision of an unoccupied frame by Empty Frame Detector 22, it will have to wait until the next unoccupied frame comes along.

Figure 5:
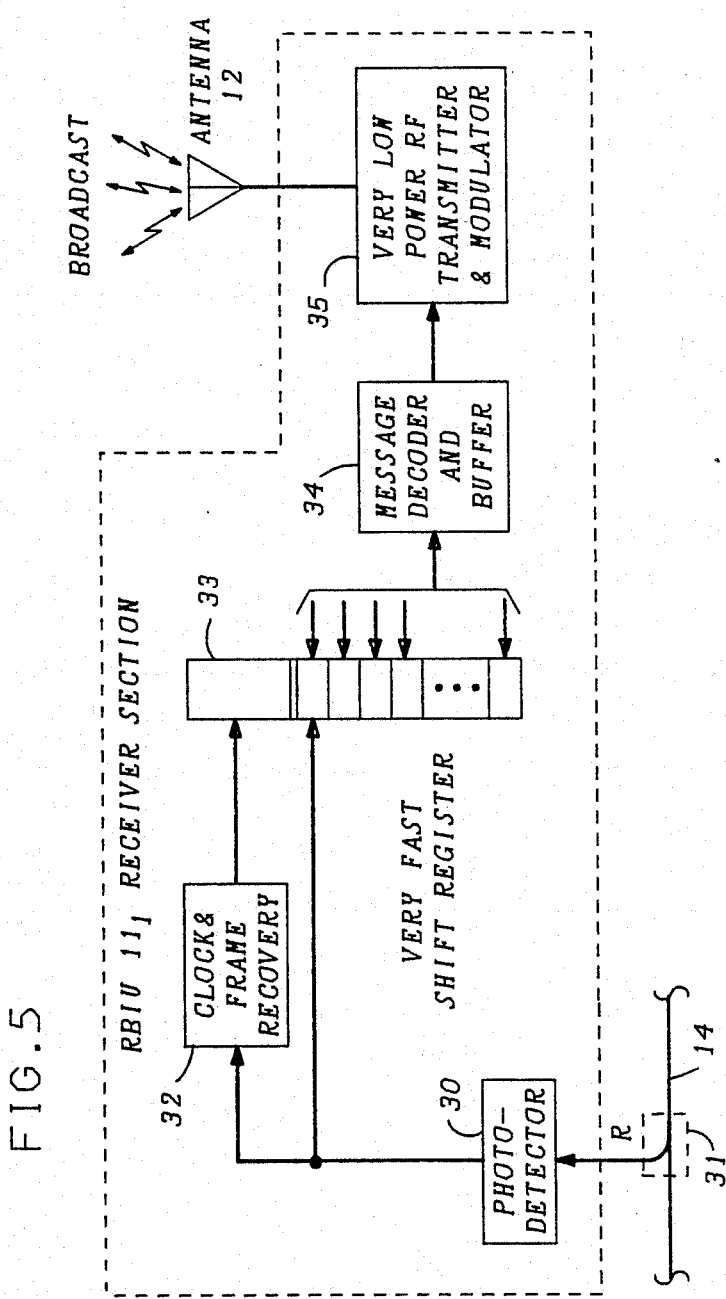
FIG. 5 is a block diagram of an exemplary Bus/RBIU receiver interface in accordance with the present invention.

The architecture of the receiver section of an RBIU $11_i$ for either one of the network arrangement of FIGS. 1 and 6 is shown in FIG. 5. There, a small portion of the light modulated bit stream propagating along bus 14 is received by a photo detector 30 via an R-directional coupler 31. Photo detector 30 functions in the manner described for photo detector 20 in the transmit section of an RBIU 11. The demodulated signal from photo detector 30 is delivered to both a Clock and Frame Detector circuit 32, which recovers the clock and frame markers from the received bit stream, and a very fast shift register 33 into which the received bit stream is serially fed. In response to enable signals from detector 32, register 33 is unloaded in parallel into a Message Decoder and Buffer 34.

In Message Decoder and Buffer 34 a decision is made, based upon the address of destination provided in the overhead portion of the packet of information, whether to discard or store the message in an included buffer. More particularly, if a packet of information includes an address destination for one of the users associated with this particular RBIU, then the packet of information is buffered, otherwise it is discarded. Messages stored in Decoder and Buffer 34 are then modulated in a Very Low Power RF Transmitter and Modulator 35 and broadcasted by antenna 12, using RF or IR, to all associated end users. In FIG. 1, an optional PBX controller 16 is shown included at the ends of bus 14 for use when the LAN serves as a PBX distribution network for bursty or variable rate wide band communications.

FIG. 6 shows an implementation of the present invention in the form of a parallel transmit/serial receive network. In the network of FIG. 6, the interchange between the users, the RBIUs 11, and the receiver bus is similar to that described hereinbefore for the network of FIG. 1. However, since the RBIUs $11_1$ to $11_N$ now transmit the formatted packets of information on separate buses $40_1$ to $40_N$, respectively, to a Multiplexer/Controller (M/C) 41, the transmissions between the RBIUs 11 and M/C 41 are at the RBIU rate and can be asynchronous. In the parallel transmit part of the network of FIG. 6, the RBIUs $11_1$ to $11_N$ independently deposit their packets of information in buffers $43_1$ to $43_N$, respectively, via respective receivers $44_1$ to $44_N$. A sequencer and controller 45 cyclically controls the loading, in parallel, of the packets of information from buffers 43 into a Very Fast Shift Register 46 via a switching means 47.

A master clock 48 in M/C 41 controls the data transfer between buffers 43, switching means 47 and Register 46 as well as the fast serial shifting of the bits from the Frame Marker Generator 49 into a Modulator and Laser circuit 50. Frame Marker Generator 49 functions as described for Frame Marker Generator 15 in the network of FIG. 1 to insert a marker at the beginning of each packet to be sent over bus 14. In circuit 50, the laser is modulated by the serially received packet of information from register 46. The modulated bit stream is fed into the high-speed bus 14 where the transmission is synchronous.

Flexibility can be built, under software control, into M/C 41 for multiplexing the packets of information from the various buffers 43 onto bus 14. For example, one or a fixed number of packets of information from each buffer $43_i$ could be cyclically multiplexed, or each buffer 43 could be emptied of its packets of information before preceding to the next buffer. Priorities could also be easily assigned to certain buffers 43 under program control. From a hardware point of view, the network of FIG. 6 is simpler than the serial network of FIG. 1, since neither the Sense (S) and Transmit (T) directional couplers nor the laser 26 and Very Fast Shift Register 25 in the transmitter of each RBIU 11 would be needed. The lower speed of the parallel transmissions on buses $40_1$ to $40_N$ of FIG. 6 would permit the use of, for example, multimode fibers and LED sources for a lightwave network of FIG. 6. The only disadvantage is the need for more buses in the parallel transmit connection. The very high-speed components, however, would still be needed in the receiver sections of the RBIUs 11 of FIG. 6 as well as in M/C 41, which is shared by all RBIUs 11. Most of the lower speed components could be integrated and implemented in TTL, ECL, CMOS, etc.

In accordance with the present invention, locating the RBIUs 11 close to their cordless end users has many advantages, among them are that (a) local communications can be achieved at very low power levels thus eliminating radiation hazards and interference problems; (b) due to the short radio paths involved, multipath dispersion is sufficiently small such that burst data rates of, for example, 20–50 Mbit/s may be possible for the local communications; and (c) simple communications protocol such as, for example, CSMA/CD, slotted ALOHA, etc., can be employed by the end users with high efficiency due to the short paths involved relative to the frame durations. Additionally, the following advantages are achieved by buffering the end users from the high-speed bus by the RBIUs: (a) the high-speed bus is not burdened with the end-user communications protocol; (b) the high-speed bus can be efficiently utilized with relatively insignificant waiting time delay penalty; (c) even at 100% utilization, the high-speed bus operation is stable.

It is to be understood that the above-described embodiments are simply illustrative of the principles of the invention. Various other modifications and changes may be made by those skilled in the art which will embody the spirit and scope thereof. For example, the network can take other forms than that shown in FIGS. 1 and 6, such as those described in the J. O. Limb et al. and C-W Tseng et al. articles disclosed hereinbefore, and cordless communication between the end users and their associated RBIU can be accomplished by RF, IR or some combination of both. The Very Fast Shift Registers 25 and 33 of FIGS. 2, 3 and 5 can be implemented by, for example, GaAs programmed logic arrays. Devices with clock frequencies of 1–2 GHz can be obtained from, for example, the Harris Corp. and the Gbit Logic C.

What is claimed is:

1. A Local Area communications network (LAN) comprising:
   a communications bus (14,40) which is routed along a predetermined path within an area to be serviced by the LAN; and
   a plurality of regional bus interface units (11) (RBIUs) disposed at separate selected points around the area to be serviced by the LAN, each RBIU comprising:
   means (12, 27, FIG. 2-3; 12, 35, FIG. 5) for providing cordless, low-level radiation, two-way communications between the RBIU and each user of a separate group of one or more network users assigned to, and located in, the proximity of the RBIU using a predetermined communications protocol;
   transmitting means (20–22, 25–26, 28, FIGS. 2-3) for (a) forming an information signal received by the cordless transmission means from a user of the associated group of users into a separate packet of information with a predetermined format including a destination user's address, (b) detecting when the communications bus is not currently propagating a packet of information from another RBIU of the network that would interfere with the transmission of the formed packet of information, and (c) transmitting the formed packet of information received from a user of the group assigned to the RBIU onto the communications bus in a detected free packet period; and
   receiving means (30, 32–34, FIG. 5) for (a) receiving formatted information signals propagating on the communications bus, (b) detecting from an included destination user's address whether or not each received information signal is destined for a user of the group of users assigned to the RBIU, and (c) delivering an information signal destined for one of said network users to the cordless two-way transmission means for transmission to the destined user.

2. An LAN according to claim 1 wherein the LAN further comprises:
means for generating periodic frame marker signals for propagation along the communications bus, each frame marker signal indicating the beginning of a frame in which a formatted information signal can be transmitted.

3. An LAN according to claim 2 wherein the generating means is disposed at the head and of the communications bus.

4. An LAN according to claim 2 wherein the generating means is disposed within the RBIU nearest a head end of the communications bus.

5. An LAN according to claim 3 or 4 wherein transmitting means comprises:
means (22) for (a) detecting both a frame marker signal propagating on the communications bus and whether or not a formatted information signal occupies the remainder of a frame period, and (b) generating an output control signal whenever a formatted information signal does not occupy the remainder of a frame period;
means (25) for storing a formatted information signal to be transmitted over the communications bus and for transmitting the formatted information signal onto the bus in response to the output control signal from the detecting and generating means.

6. An LAN according to claim 2 wherein the receiving means comprises:
means (32) for detecting a frame marker signal propagating on the communications bus and for generating an output control signal whenever the frame marker signal is detected;
means (33) responsive to the output control signal from the detecting and generating means for temporarily storing information received from the communications bus in the frame period associated with the detected frame marker signal; and
means (34, 35) responsive to the information stored in the storing means for determining from the included destination user's address whether or not the received information signal is destined for a user of the group assigned to the RBIU, and for cordlessly transmitting each information signal destined for a user of said group to that user.

7. An LAN according to claim 1, 2, or 6 wherein the communications bus is a lightguide for propagating optical signals.

8. An LAN according to claim 1, 2 or 6 wherein the communications bus is capable of propagating electrical signals.

9. A Regional Bus Interface Unit (RBIU) for use in a Local Area Network (LAN), the RBIU comprising:
a first (S) and a second (R) input terminal and an output terminal (T);
means for providing cordless, low-level radiation, two-way transmissions of information signals between the RBIU and each user of a group of one or more users assigned to the RBIU;
transmitting means connected between the first input terminal and the output terminal and to the cordless transmission means for (a) arranging information signals received by the cordless transmission means from a user assigned to the RBIU into formatted packet information signals, (b) detecting when a formatted information signal is not received at the first input terminal during a predetermined time period, and (c) transmitting information signals received from a user of the group of one or more users assigned to the RBIU in a predetermined format including a destination user's address to the output terminal during the detected time period; and
receiving means coupled to the second input terminal for (a) receiving formatted information signals from the second input terminal, (b) detecting from an included destination user's address whether or not a received information signal is destined for a user of the group of one or more users assigned to the RBIU, and (c) delivering an information signal destined for a user of the group to the cordless two-way transmission means for transmission to the destined user.

10. An RBIU according to claim 9 wherein the transmitting means comprises:
means for (a) detecting both a periodic frame marker signal received at the first input terminal, which frame marker signal is disposed at the start of a frame period, and whether or not a formatted information signal is received at the first input terminal during the remainder of the frame period, and (b) for generating an output control signal whenever a formatted information signal is not received at the first input terminal during a frame period; and
means for storing a formatted information signal to be delivered to the output terminal and for transmitting the formatted information signal to the output terminal in response to the output control signal from the detecting and generating means.

11. An RBIU according to claim 9 or 10 wherein the receiving means comprises:
means for detecting a frame marker signal received at the second input terminal and for generating an output control signal whenever a frame marker signal is detected;
means responsive to the output control signal from the detecting and generating means for temporarily storing an information signal received at the second input terminal in a frame period associated with a frame marker signal; and
means responsive to the information signal stored in the storing means for determining from the included destination user's address whether or not the received information signal is destined for a user of the group assigned to the RBIU, and for cordlessly transmitting each information signal destined for a user of the group to that user.

12. An RBIU according to claim 11 wherein the first and second input terminals are arranged to receive lightwave signals and the transmitting means is arranged to transmit lightwave signals to the output terminal.

13. An RBIU according to claim 11 wherein the first and second input terminals are arranged to receive electrical signals and the transmitting means is arranged to transmit electrical signals to the output terminal.

14. An RBIU according to claim 9 wherein the cordless transmission means provides two-way communications with the user of the group using radio frequency signals.

15. An RBIU according to claim 9 wherein the cordless transmission means provides two-way communications with the users of the group using infrared signals.

* * * * *